Patented Nov. 20, 1951

2,575,694

UNITED STATES PATENT OFFICE 2,575,694

3,5,5-TRIMETHYLOXAZOLIDINE-2,4-DIONE

Marvin A. Spielman, Waukegan, Ill., assignor to Abbott Laboratories, North Chicago, Ill., a corporation of Illinois No Drawing. Application March 2, 1949,
Serial No. 79,295

1 Claim. (Cl. 260—307)

The present invention relates to the chemical compound 3,5,5-trimethyloxazolidine - 2,4-dione represented by the following formula:

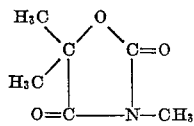

The present invention is based upon a research investigation resulting in the discovery that the presence of a methyl group in the 3-position produced radical changes in the therapeutic properties of certain 5-lower alkyl and 5,5-dilower alkyl oxazolidine-2,4-diones. With continued investigation it was discovered that the N-methyl compounds having a lower alkyl group or groups containing from one to three carbon atoms at the 5-position, possess valuable therapeutic properties. It was discovered in particular that of these compounds, the compound 3,5,5-trimethyloxazolidine - 2,4-dione displayed especially valuable therapeutic properties.

The basic ring of the compound of the present invention is known in the art as oxazolidine-2,4-dione. This compound as well as the 5,5-dimethyl derivative used in preparing the compound of the present invention may be produced by various processes. For example, 5,5-dimethyl-oxazolidine-2,4-dione may be prepared by reacting acetone with sodium cyanide and with ammonium thiocyanate followed by desulfurization. This intermediate may also be prepared by condensing α-hydroxyisobutyramide with ethyl chlorocarbonate or by condensing ethyl α-hydroxyisobutyrate with urea. Another method described (Traube and Aschar (Ber., 46 2,077–1913)) consists in the condensation of ethyl α-hydroxyisobutyrate with guanidine followed by hydrolysis.

The compound 3,5,5-trimethyloxazolidine-2,4-dione of the present invention may be prepared by various processes. The most satisfactory process involves the alkylation of the 5,5-dimethyl oxazolidine-2,4-dione intermediate with dimethyl sulfate. The following example will serve for illustrative purposes:

3,5,5-dimethyloxazolidine-2,4-dione

About 30 grams of sodium hydroxide are added to about 72 grams of 5,5-dimethyloxazolidine-2,4-dione dissolved in 400 cc. of water. To this solution, with external cooling and violent stirring, are added (dropwise) about 85 grams of dimethyl sulfate, the rate of addition being such that the temperature of the reaction solution does not rise above 50° C. The reaction mixture is then extracted with ether, the ether removed in the usual manner and the extract distilled at about 82°–85° C. at 5 mm. The purified product crystallized from ethyl ether or from water forms stout prisms with a melting point of about 45°–46° C.

The compound of the present invention is characterized by its analgesic properties coupled with substantially low or relatively no hypnotic activity. More particularly, the compound has been found to be an excellent anticonvulsant in the treatment of petit mal epilepsy.

This application is a continuation-in-part of my co-pending application Serial No. 779,424, filed October 11, 1947, which in turn is a continuation-in-part of application Serial No. 630,944, filed November 26, 1945, now abandoned, which in turn is a continuation-in-part of my original application Serial No. 403,073, filed July 18, 1941, now abandoned.

Others may readily adapt the invention for use under various conditions of service, by employing one or more of the novel features disclosed, or equivalents thereof. As at present advised with respect to the apparent scope of my invention, I desire to claim the following subject matter.

I claim:

The compound 3,5,5-trimethyloxalidine-2,4-dione represented by the following formula:

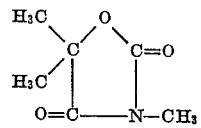

MARVIN A. SPIELMAN.

REFERENCES CITED

The following references are of record in the file of this patent:

Chemical Abstracts, vol. 14, pp. 46 to 48 (1920).

Beilstein, 4th Ed., vol. 27, pp. 251 to 253 (1937).

Groggins, "Unit Processes in Organic Synthesis," McGraw-Hill, 2nd. Ed., pp. 488–489 (1938).